US009643447B2

(12) United States Patent
Bollini et al.

(10) Patent No.: US 9,643,447 B2
(45) Date of Patent: May 9, 2017

(54) PLANT PRODUCING WRITING INSTRUMENT AND METHOD OF GROWING A PLANT

(71) Applicant: Sprout Denmark ApS, Taastrup (DK)

(72) Inventors: Mario Bollini, Sterling Heights, MI (US); Benjamin Judge, Tewksbury, MA (US); Lauren Hernley, Elizabethtown, PA (US)

(73) Assignee: Sprout IP APS, Taastrup (DK)

( * ) Notice: Subject to any disclaimer, the term of this patent is extended or adjusted under 35 U.S.C. 154(b) by 66 days.

(21) Appl. No.: 14/421,260

(22) PCT Filed: Aug. 16, 2013

(86) PCT No.: PCT/US2013/055309
§ 371 (c)(1),
(2) Date: Feb. 12, 2015

(87) PCT Pub. No.: WO2014/028827
PCT Pub. Date: Feb. 20, 2014

(65) Prior Publication Data
US 2015/0202914 A1    Jul. 23, 2015

Related U.S. Application Data

(60) Provisional application No. 61/683,715, filed on Aug. 16, 2012.

(51) Int. Cl.
| | |
|---|---|
| *A01G 9/02* | (2006.01) |
| *A01G 9/10* | (2006.01) |
| *A01G 1/00* | (2006.01) |
| *B43K 29/20* | (2006.01) |

(Continued)

(52) U.S. Cl.
CPC .............. *B43K 29/20* (2013.01); *A01C 1/04* (2013.01); *A01C 21/00* (2013.01); *A01G 1/001* (2013.01);
(Continued)

(58) Field of Classification Search
CPC . A01G 1/001; A01G 9/02; A01C 1/04; B43K 29/00
(Continued)

(56) References Cited

U.S. PATENT DOCUMENTS

| | | | |
|---|---|---|---|
| 5,853,780 | A | 12/1998 | Kumar |
| 6,773,188 | B1 | 8/2004 | Tamaye |
| 2006/0147252 | A1 | 7/2006 | Torrell |

FOREIGN PATENT DOCUMENTS

| | | |
|---|---|---|
| CN | 202965665 | 6/2013 |
| CN | 203198466 | 9/2013 |

(Continued)

OTHER PUBLICATIONS

Sprout, Kickstarter, www.kickstarter.com/projects/democratech/sprout-a-pencil-with-a-seed, Aug. 20, 2012, 10 pages.*

(Continued)

*Primary Examiner* — Monica Williams
(74) *Attorney, Agent, or Firm* — Greenberg Traurig, LLP; Chinh H. Pham; Roman Fayerberg

(57) ABSTRACT

The present disclosure provides instruments, kits and methods for growing a plant. In some embodiments, a plant producing writing instrument is provided. Such writing instrument may include a housing having a writing end and an opposing non-writing end. In addition, a capsule with one or more seeds may be disposed at the non-writing end of the housing. The capsule may be degradable after placement in a moist soil to release the one or more seeds.

19 Claims, 3 Drawing Sheets

(51) Int. Cl.
  *B43K 29/00* (2006.01)
  *B43K 15/00* (2006.01)
  *B43K 19/02* (2006.01)
  *B43K 19/16* (2006.01)
  *B43K 29/02* (2006.01)
  *A01C 1/04* (2006.01)
  *A01C 21/00* (2006.01)
  *B43K 8/02* (2006.01)
  *A01G 9/00* (2006.01)

(52) U.S. Cl.
  CPC .................. *A01G 9/02* (2013.01); *B43K 8/02* (2013.01); *B43K 15/00* (2013.01); *B43K 19/02* (2013.01); *B43K 19/16* (2013.01); *B43K 29/00* (2013.01); *B43K 29/004* (2013.01); *B43K 29/02* (2013.01); *A01G 9/006* (2013.01); *A01G 9/102* (2013.01)

(58) Field of Classification Search
  USPC .................................................... 47/58.1 SE
  See application file for complete search history.

(56) References Cited

FOREIGN PATENT DOCUMENTS

| | | |
|---|---|---|
| JP | 2001320914 | 11/2001 |
| KR | 2012-0040934 | 4/2012 |
| WO | 2012074557 | 6/2012 |

OTHER PUBLICATIONS

Supplemental European Search Report issued in European application No. 13829929.2 mailed May 10, 2016.
International Preliminary Report on Patentability for International Application PCT/US2013/055309 mailed Feb. 26, 2015.
"To Be Nature Wood Chopstick" Gyeongwan Koo (Oliver); Yanko Designs, Oct. 18, 2011. http://www.yankodesign.com/2011/10/18/chopstick-gardens/.
International Search Report for International Application No. PCT/US2013/055309 mailed Nov. 22, 2013.

\* cited by examiner

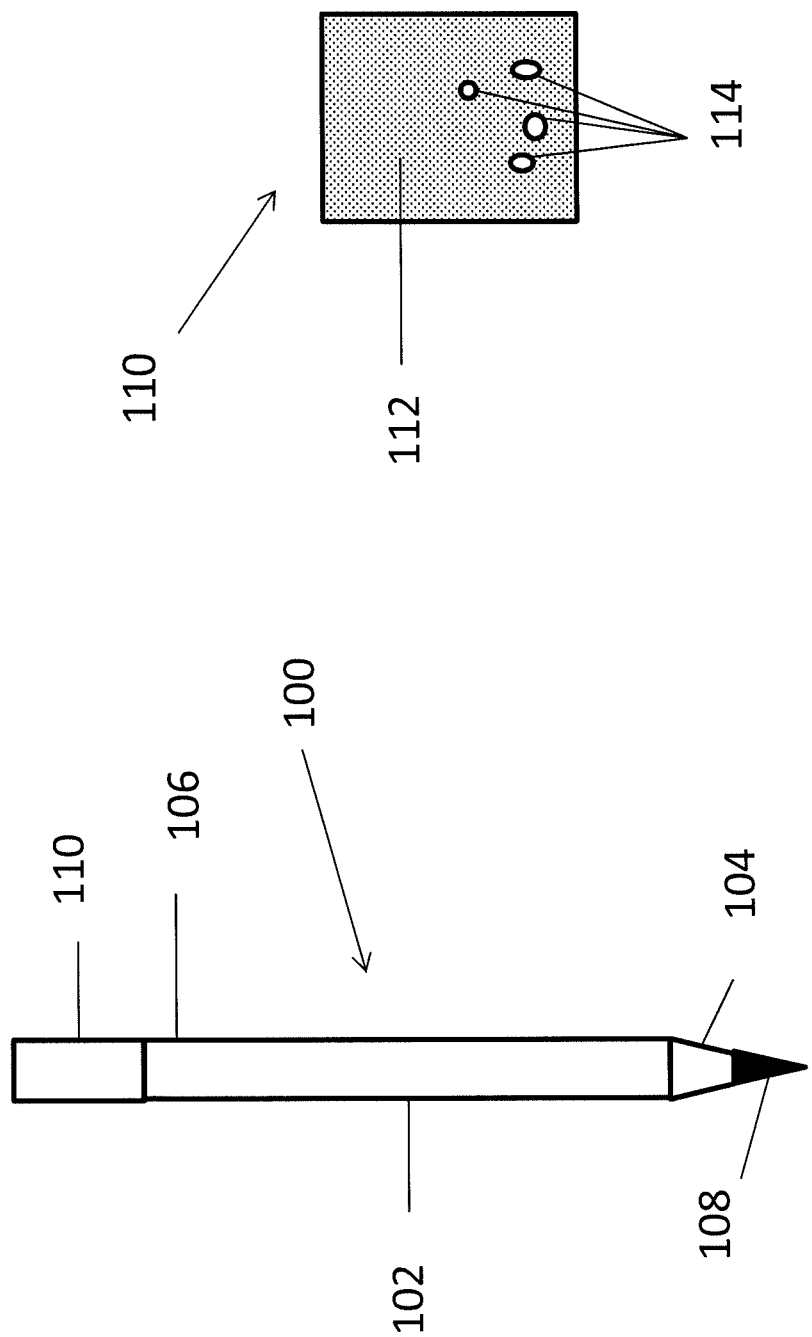

PLANT PRODUCING WRITING INSTRUMENT AND METHOD OF GROWING A PLANT

RELATED APPLICATIONS

This application is a U.S. national stage application of International Patent Application No. PCT/US2013/055,309, filed on Aug. 16, 2013, which claims the benefit of and priority to U.S. Provisional Application No. 61/683,715, entitled "SPROUT: A PENCIL WITH A SEED INSIDE," which was filed on Aug. 16, 2012, each of which is incorporated herein by reference in its entirety

SUMMARY

The present disclosure relates to a plant producing writing instruments, and in particular to writing instruments having a plantable portion with a seed, and methods of growing a plant from such seed.

BACKGROUND

Pencils are typically constructed of a wood casing surrounding a graphite core. The wood casing is partially removed at one end to expose some of the core, such as graphite, for the purpose of writing, drawing or marking. As the pencil is being used, the exposed section of the core wears out and becomes dull. To sharpen the pencil, an additional portion of the casing needs to be removed to sharpen the pencil. Eventually, after repeated sharpenings and removal of casing, the pencil becomes too short to use and is typically thrown out. Other writing instruments suffer a similar fate. After a period of use, they will run out of ink or break, and will be thrown out. The number of writing instruments that are thrown out each year is staggering and can lead to unnecessary waste. There is thus a need for a pencil or another type of writing instruments that can be enjoyed even after they are no longer suitable for their primary purpose of writing or drawing.

SUMMARY

The present disclosure provides instruments, kits and methods for growing a plant. In some embodiments, a plant producing writing instrument is provided. Such writing instrument may include a housing having a writing end and an opposing non-writing end. In some embodiments, the housing may include a wooden casing and a marking core housed within the casing, the marking core being exposed at the writing end of the housing and is sharpenable by removing the casing. In addition, a capsule with one or more seeds may be disposed at the non-writing end of the housing. The capsule may be degradable after placement in a moist soil to release the one or more seeds. The capsule may further include a substrate expandable when planted into the moist soil to deliver the one or more seeds outside the capsule.

In some embodiments, a kit for growing a plant is provided. The kit may include a writing instrument, such as a pencil, having a writing end and an opposing non-writing end. The kit may further include a capsule for attachment at the non-writing end of the writing instrument, the capsule being degradable upon placement in a moist soil. The capsule may include one or more seeds for producing a plant.

In some embodiments, a method for extending enjoyment of a writing instrument is provided. First, a capsule with one or more seeds may be attached to a writing instrument, such as a pencil. When the writing instrument is exhausted, or sooner if desired, the capsule may be planted into a moist soil, which may cause the capsule to degrade and release the one or more seeds. One or more plants may subsequently grow from the one or more seeds.

BRIEF DESCRIPTION OF THE DRAWINGS

The presently disclosed embodiments will be further explained with reference to the attached drawings, wherein like structures are referred to by like numerals throughout the several views. The drawings shown are not necessarily to scale, with emphasis instead generally being placed upon illustrating the principles of the presently disclosed embodiments.

FIG. 1 is a side view of a writing instrument of the present disclosure.

FIG. 2 is a side view of a capsule with a seed of the present disclosure.

Figure 3:
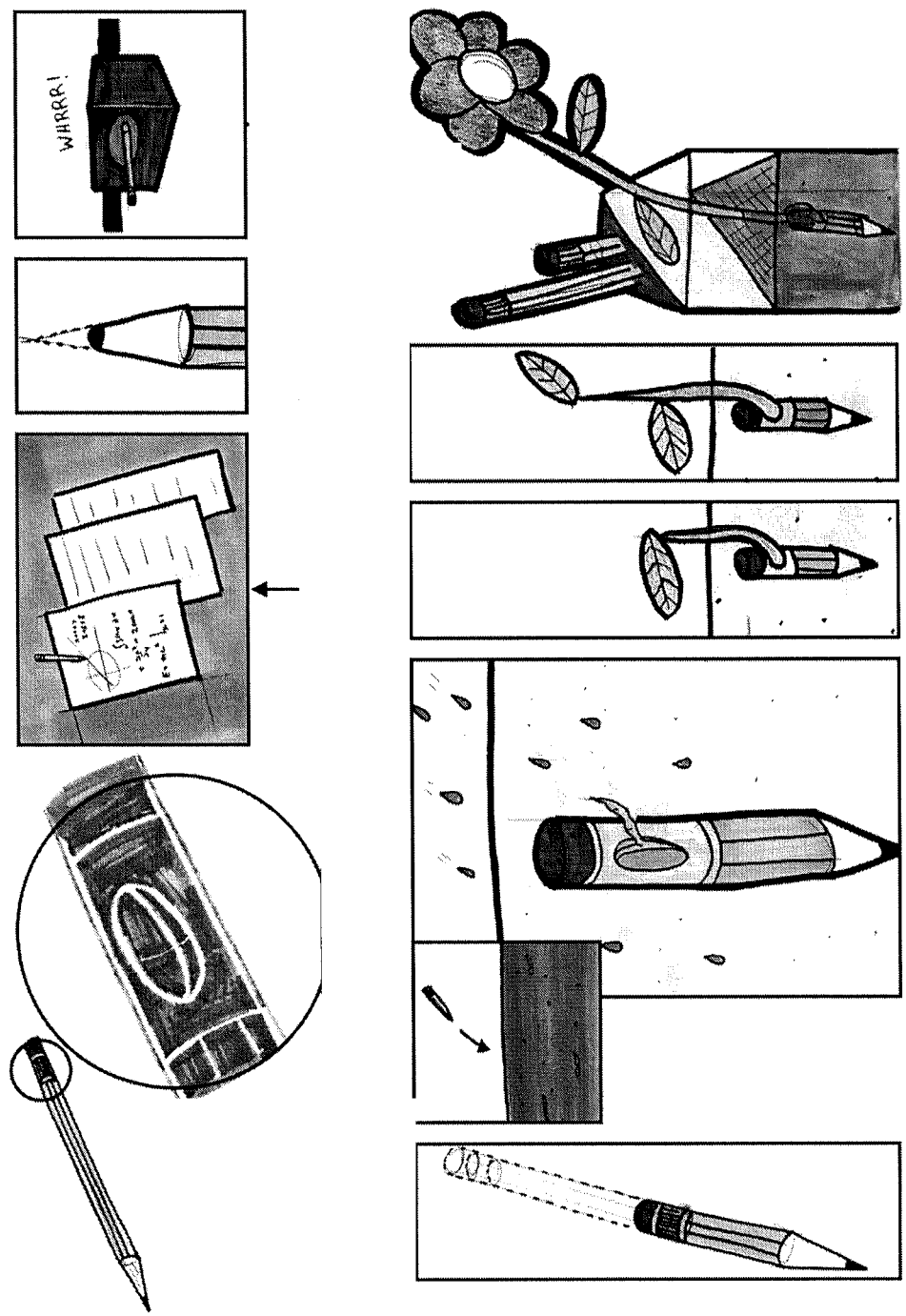
FIG. 3 illustrates an embodiment of methods for using and planting a writing instrument of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

In reference to FIG. 1, there is provided a plant producing writing instrument 100 in accordance with the present disclosure. The writing instrument 100 includes, in some embodiments, a casing or housing 102 and a capsule 110 holding one or more seeds from which one or more plants can be grown. When the writing instrument 100 is exhausted, that is, no longer useable for writing or marking, or otherwise no longer needed, the capsule can be planted to grow the one or more plants.

In reference to FIG. 2, the capsule 110 may include one or more seeds 114 from which one or more plants can be grown. In this manner, the capsule 110 may be planted, by itself or with at least a portion of the writing instrument, and activated to release the seeds 114 to enable germination and growth of the seeds 114. Various types of seeds may be used in connection with the writing instrument 100 of the present disclosure. Suitable seeds may include, but are not limited to, (i) flowers like calendula and marigold and others, (ii) herbs like parsley, sage, rosemary, thyme, basil, dill, mint, and others, and (iii) vegetables like tomatoes, eggplant, jalapenos, peppers, and others. In some embodiments, the seed varieties can be further varied to include flowers matched in color or style to the color or style of the writing instrument 100. For example, colored pencils can grow into colored flowers of matching color to the pencil lead. Additionally or alternatively, fungal spore, virus, or bacterial (or other microbiological) varieties may be included in the capsule 110. In some embodiments, various seed types can be mixed to produce a variety of plants grown from the capsule.

Capsule 110, in some embodiments, protects the one or more seeds 114 from physical harm and exposure to moisture and light during ordinary course of use until the capsule 110 is planted. To that end, the capsule 110 may be made of water proof or water resistant material. In some embodiments, the capsule 110 forms a seal around the one or more seeds 114 to prevent moisture from entering the capsule 112 and irrigating the seeds 114, which may result in premature germination of the seeds 114. In some embodiments, the capsule 110 may be made from opaque or non-transparent material to protect the one or more seeds 114 from exposure to light. On the other hand, the capsule 100 is designed to degrade or dissolved upon sustained exposure to moisture, such as when the capsule is planted into a moist soil. In this manner, when the capsule 100 is planted into a moist soil, the capsule 100 may degrade or dissolve to release from the capsule 110 the one or more seeds 114, which may subsequently grow into one or more plants. In some embodiments, the capsule may be made of cellulose or gelatin.

With continued reference to FIG. 2, the capsule 100 may further include a substrate 112 in which the one or more seeds 114 may be buried inside the capsule 110. In some embodiments, the substrate 112 may be dense to enable efficient packing of the substrate into the capsule 110. The substrate 112 may further protect the seeds 114 from physical harm as well as exposure to moisture or light. In some embodiments, at least a portion of the substrate 112 may be expandable upon exposure to moisture, such as when the substrate is planted into a moist soil. In this manner, when the capsule 110 is planted in the moist soil and begins degrades, the substrates 112 may absorb moisture from the soil and may expand to rupture the capsule 110 (if the capsule has not yet dissolved or degraded) to deliver the one or more seeds outside the capsule 110. Upon activation, the expanding substrate 112 may push the capsule 110 away from the seeds 114, providing aeration and preventing suffocation of the seeds during germination. In some embodiments, the substrate 112 includes dry peat, which may expand upon exposure to moisture. Additional suitable materials for the substrate include, but are not limited to, regular potting soil, crushed coconut shell, sphagnum moss or combinations thereof.

Referring back to FIG. 1, the capsule 110 may be attached, at one end, to the writing instrument 100. In some embodiments, the capsule 110 may be permanently or fixedly attached to the writing instrument 100. In other embodiments, the capsule 110 may be detachably engaged from the writing instrument 100. In some embodiments, an eraser (not shown) may be attached to the capsule, at the end not attached to the writing instrument 100, to enable the user to erase writing made by the writing instrument 100.

In some embodiments, the capsule 110 may be integral to the casing 102 of the writing instrument 110. In such embodiments, a cavity may be created in the non-writing end of the casing 102. The cavity may be filled with an expandable substrate with one or more seeds. The outer end of the cavity may be covered with a degradable cover, such as cellulose or gelatin. When the writing instrument is planted, the cover may degrade enabling the expandable substrate to push the one or more seeds out of the cavity in the casing. In some embodiments, the casing 102 may be made of a degradable material so when the writing instrument is planted, the casing will degrade, releasing the one or more seeds. It should be noted that the plantable capsule of the present disclosure may be attached to any other type of instrument, apparatus, or tool, such as, by way of a non-limiting example, other office supplies or kitchen tools.

The writing instrument 100, in some embodiments, may include a casing or housing 102 for holding a writing or marking device or ink. The casing 102 has a writing end 104 and a non-writing end 106 opposite the writing end 104. The writing instrument 100 may be selected from any writing instrument, including, but not limited to, pens, pencils, markers, highlighters, brushes or any other instruments that can be used for marking, writing or drawing. In some embodiments, the writing instrument 100 may be a conventional pencil with a wooden casing 102 and a graphite or pigment core 108 inside the casing 102. As in any conventional pencil, the core 108 may be exposed at the writing end 104 of the casing 102 to enable the writing instrument 100 to make a mark. As the exposed section of the core 108 wears out and becomes dull, the pencil can be sharpened by removing the wooden casing 102 to expose a desired length of the core 108.

In some embodiments, a kit for a plant producing writing instrument may be provided. In some embodiments, the kit may include a casing 102 with a core and a capsule 110, which can be attached to the casing 102. In some embodiments, the substrate 112, seeds 114, and means for attaching the capsule 110 to the casing 102 may also be included in the kit.

To assemble the writing instrument 100, in some embodiments, the capsule 110 may packed with the substrate 112. In some embodiments, the substrate 112 is provided as a fine, dry powder. It may be desirable to break up any clumps or lumps in the substrate 112 to ensure consistency of the substrate 112. In some embodiments, the substrate 112 may be compacted inside the capsule 112. One or more seeds may be added to the substrate 112. In some embodiments, the capsule 110 may have a close end to enable the capsule 110 to retain the substrate 112 and the seeds 114 and an open end opposite the closed end. In some embodiments, the capsule 110 may be supplied already packaged with the substrate 112 and the seeds 114.

To engage the capsule 110 with the writing instrument 100, the non-writing end 106 of the writing instrument 100 may be inserted into the open end of the capsule 110. In some embodiments, the non-writing end 106 of the writing instrument 100 may be shaped, using, for example, a router, for easier insertion into the capsule 112. In some embodiments, the capsule 110 and the non-writing end 106 of the writing instrument 100 may be sized to create a friction fit with one another. Additionally or alternatively, additional attachment means, such as, for example, adhesive, fasteners or similar, may be used to secure the capsule 110 to the writing instrument 100. In some embodiments, the capsule 110 may have both ends closed for ease of manufacturing, and the capsule 110 may be attached to the writing instrument 100 by mechanical means.

Figure 4:
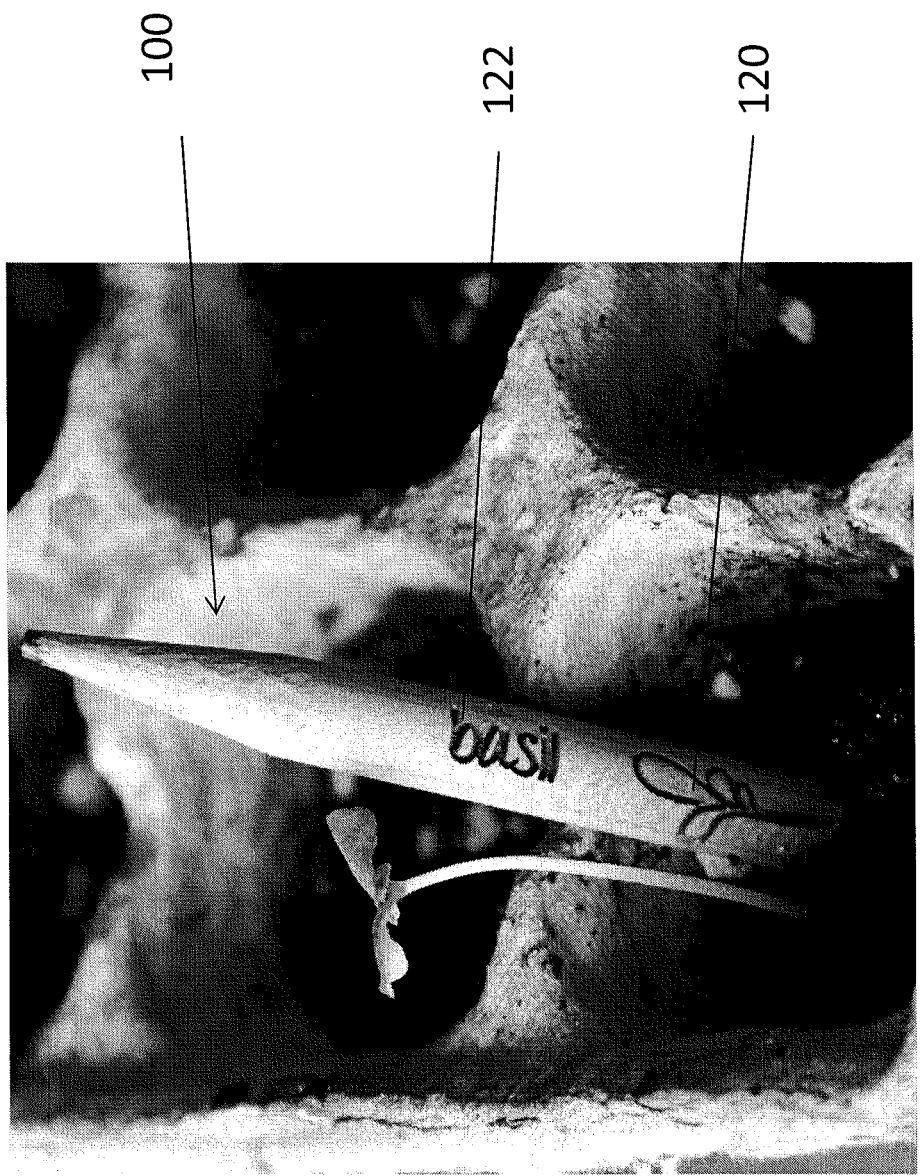
FIG. 4 illustrates a planted writing instrument of the present disclosure.

In reference to FIG. 3, in operation, the writing instrument 100, specifically a pencil, having a capsule 112 engaged to the non-writing end 106 of the writing instrument 100 is provided. The pencil 100 may be used to write or draw until the pencil 100 becomes too short for further use due to repeated sharpening of the pencil 100. At this point, the capsule 110 containing one or more seeds 114 may be planted into soil, either alone or with the remaining segment of the pencil 100. In some embodiments, the writing instrument 100 may include a indicia 120 directing the user to plant the capsule in a certain direction, such as shown in FIG. 4. In some embodiments, the writing instrument may include the name of the seed 122 and can be used as helpful planting marker.

Because the capsule 110 is water activated, the first few waterings of the capsule 110 may activate the capsule and start the germination of one or more seeds. Once planted, the capsule 110 is exposed to moisture and begins to disintegrate or dissolve which allows moisture to reach the seed 114 to cause it to begin germination. In embodiments with the expanding substrate 112, the substrate 112 may expand due to the presence of moisture to deliver the seeds 114 outside the capsule 110. Conventional gardening practices may then be followed to allow the seeds 114 to grow and mature. It should be noted that while the method of using and planting the writing instrument of the present disclosure was described in reference to a pencil, a similar method is applicable to other types of writing instruments.

All patents, patent applications, and published references cited herein are hereby incorporated by reference in their entirety. It will be appreciated that several of the above-disclosed and other features and functions, or alternatives thereof, may be desirably combined into many other different systems or applications. Various alternatives, modifications, variations, or improvements therein may be subsequently made by those skilled in the art which are also intended to be encompassed by the following claims.

What is claimed is:

1. A plant producing writing instrument comprising:
   a housing having a writing end and an opposing non-writing end;
   a capsule disposed at the non-writing end of the housing, the capsule including one or more seeds and being made from a material degradable after placement in a moist soil to release the one or more seeds; and
   an indicia located on the housing to assist with the placement of the non-writing end of the housing into the soil, the indicia including a representation of a plant having a stem, the stem extending toward the capsule such that the indicia is oriented in an upright position upon placement of the non-writing end of the housing into the soil.

2. The plant producing writing instrument of claim 1, wherein the housing includes a wooden casing and a marking core housed within the casing, the marking core being exposed at the writing end of the housing and is sharpenable by removing the casing.

3. The plant producing writing instrument of claim 1, wherein the capsule protects the one or more seeds from being exposed to moisture.

4. The plant producing writing instrument of claim 1, wherein the capsule is opaque to protect the one or more seeds from light.

5. The plant producing writing instrument of claim 1, wherein the capsule further includes a substrate expandable when planted into the moist soil to deliver the one or more seeds outside the capsule.

6. The plant producing writing instrument of claim 1, wherein the capsule is detachably engaged to the housing to enable planting of the capsule alone.

7. The plant producing writing instrument of claim 1, wherein the capsule is fixedly attached to the housing for planting the capsule together with at least a portion of the housing.

8. The plant producing writing instrument of claim 1, wherein the capsule is formed within the housing.

9. The plant producing writing instrument of claim 1 further comprising an eraser attached to the capsule in opposing relationship to the housing.

10. The method of claim 1, wherein in the step of attaching, the writing instrument is a pencil.

11. A kit for growing a plant comprising:
    a writing instrument having a writing end and an opposing non-writing end;
    a capsule for attachment at the non-writing end of the writing instrument, the capsule being made from a material degradable upon placement in a moist soil;
    one or more seeds for producing a plant; and
    an indicia located on the writing instrument to assist with the placement of the non-writing end of the writing instrument into the soil, the indicia including a representation of a plant having a stem, the stem extending toward the capsule such that the indicia is oriented in an upright position upon placement of the non-writing end of the writing instrument into the soil.

12. The kit of claim 11 further comprising a substrate expandable upon placement in the moist soil.

13. The kit of claim 11, wherein the writing instrument is a pencil.

14. The kit of claim 11, wherein the capsule protects the one or more seeds from being exposed to moisture.

15. The kit of claim 11, wherein the capsule is opaque to protect the one or more seeds from light.

16. A method for extending enjoyment of a writing instrument:
    placing, into a degradable capsule, one or more seeds;
    attaching the capsule to a non-writing end of a writing instrument having an indicia located thereon to assist with the placement of the non-writing end of the writing instrument into the soil, the indicia including a representation of a plant having a stem, the stem extending toward the capsule such that the indicia is oriented in an upright position upon placement of the non-writing end of the writing instrument into the soil;
    planting, after the writing instrument is exhausted and looking at the indicia, the capsule into a moist soil to cause the capsule to degrade and release the one or more seeds; and
    growing one or more plants from the one or more seeds.

17. The method of claim 16 further comprising adding, into the capsule, a substrate expandable when planted in the moist soil.

18. The method of claim 16, wherein the entire writing instrument is submerged in the soil upon placement of the non-writing end into the soil.

19. The method of claim 16, wherein at least a portion of the indicia protrudes from the soil upon placement of the non-writing end into the soil.

* * * * *